A. R. HOEFT.
DEVICE FOR REPAIRING PNEUMATIC TIRE TUBES.
APPLICATION FILED OCT. 3, 1910.
1,049,090.
Patented Dec. 31, 1912.
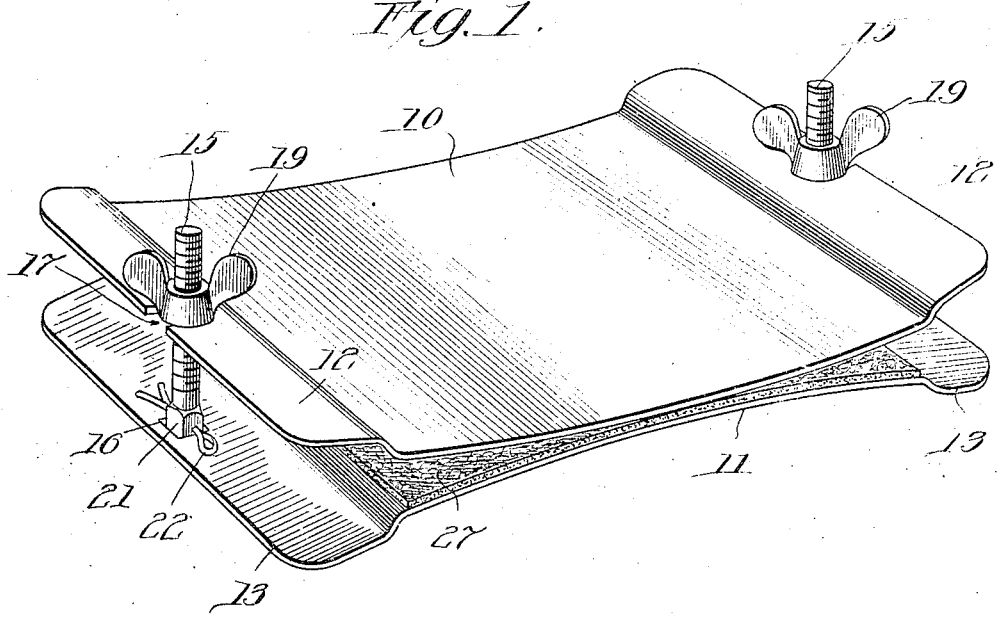
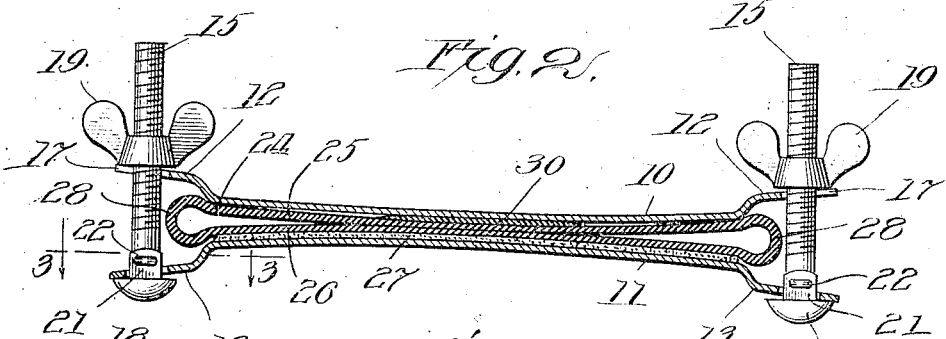
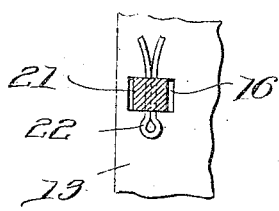
Witnesses:
Harry S. Gaither
William Goldberger.
Inventor
Adolph R. Hoeft
by William W. Hall
Atty

UNITED STATES PATENT OFFICE.

ADOLPH R. HOEFT, OF CHICAGO, ILLINOIS.

DEVICE FOR REPAIRING PNEUMATIC-TIRE TUBES.

1,049,090. Specification of Letters Patent. Patented Dec. 31, 1912.

Application filed October 3, 1910. Serial No. 585,010.

*To all whom it may concern:*

Be it known that I, ADOLPH R. HOEFT, a citizen of the United States, and a resident of Chicago, in the county of Cook and State of Illinois, have invented certain new and useful Improvements in Devices for Repairing Pneumatic-Tire Tubes; and I do hereby declare that the following is a full, clear, and exact description thereof, reference being had to the accompanying drawings, and to the characters of reference marked thereon, which form a part of this specification.

This invention relates to a novel clamp device for repairing the inner tubes of pneumatic tires by which to press a patch having cement applied thereto upon the injured part of the tire until the cement properly sets.

Among the objects of the invention are to provide a device of this character which will apply the cement setting pressure only on the part of the tube to which the patch is to be applied, whereby the side folds of the flattened, deflated tube are not pressed together in a manner to break the tube at such folds; to provide a clamping device of this character which is equally well adapted to apply small and larger patches; to provide a clamping device which will spread the cement uniformly over the patch and the adjacent face of the injured part of the tube, and to otherwise improve the device, as will hereinafter more fully appear.

In the drawings,—Figure 1 is a perspective view of a tube repairing clamp embodying my invention. Fig. 2 is a longitudinal section thereof, showing the manner of use of the device. Fig. 3 is a detail section on the line 3—3 of Fig. 2.

A device embodying my invention embraces two substantially identical upper and lower spring metal plates 10, 11 of generally oblong rectangular shape. Said plates are longitudinally curved and are arranged with their convex sides facing each other, said plates touching, when not under tension, along the central transverse axes of the plates. The outer end margins 12, 13 of the plates are offset from the body portion and flattened, and are located a distance from each other, with the margin of one plate substantially parallel to the adjacent margin of the other plate. 15, 15 designate screw bolts which extend through oblong holes 16 in the flattened ends of one of the plates and engage notches 17 in the flattened end margins of the other plate. The screw bolts are provided with heads 18 which fit under the apertured flat margins of the plate 11, and are provided with thumb nuts 19 which have screw-threaded engagement with the screw-threaded ends of the bolts and bear against the upper sides of the flattened end margins of the upper plate 10. Near the heads of said bolts they are provided with squared portions 21 in the manner of an ordinary carriage bolt to prevent the bolts from turning in their squared openings 16, and said squared portions of the bolts above the flattened end margins of the lower plate 11 are pierced by cotter pins 22 or other keys so as to prevent the bolts dropping through said holes or openings 16 when the outer ends of the bolts are released from the notched, flattened margins of the upper plate 11. The said openings 16 are elongated to permit the bolts to fit loosely therein and thereby permit said bolts to swing outwardly at their free or threaded ends from the notches 17 and thus permit the upper clamping plate to be removed from the lower plate without the necessity of removing the thumb nuts 19.

The manner of clamping a deflated tire tube between the plates to set a patch on a punctured or torn area of the tube is illustrated in Fig. 2. As therein shown the deflated tube 24 is flattened with the upper wall 25 thereof in contact with the upper plate and the lower wall 26 in contact with a cushioning pad 27 which is preferably applied to the upper side of the lower plate. The folded edges 28 lie between the flattened margins 12, 13 of the plates which, by reason of their being offset, are never brought together, so that said folded margins of the flattened tire are not pinched in a manner to break or crack the same. 30 designates a patch which is applied to the upper punctured wall of the tube, between the tube and said plate, and is pressed upon said upper wall by said upper plate.

In repairing a punctured or torn tube, the thumb nuts are released to permit the screw bolts to be swung away from the notched ends of the upper plate, after which the upper plate is separated from the lower plate. Thereafter the injured tube is placed, in the flattened position shown in Fig. 2, on the pad 27 of the lower plate, and the patch 30 with cement spread thereon, applied over the punctured area of the upper wall of the flattened tube. Thereafter the upper plate is placed with its central convex portion on the patch, which is arranged to be intermediate the ends of said plates. Thereafter the screw bolts are swung upwardly into engagement with the notches 17 of the upper plate and the thumb nuts turned down upon the screw-threaded ends of said bolts.

The clamping pressure exerted by said nuts acts to press the plates together with the flattened tube between them. By reason of the fact that the convex faces of said plates are opposed to each other when the device is assembled, the first pressure is brought to bear by the small transverse median portions of said plates upon the transverse center of the flattened tube, and at the patch which has been applied over the injured part of the tire. As the thumb nuts 19 are screwed downwardly on the clamping bolts the intermediate convex portions of the plates, which were first brought into contact with the tube and the patch, begin to gradually flatten and to become parallel with each other to press the patch on the tube. If the patch be a small one, but little pressure need be applied in order to secure the necessary contact of the pressure plates or members on the patch. The larger the patch the greater will be the pressure required on the clamping bolts, and the greater will be the extent of the flattening of the plates, and the pressure areas of said plates will gradually progress outwardly, as the applied pressure increases, from the initial median line of contact or pressure area until the upper plate is flattened throughout the entire extent of the patch. In any case, however, the pressure per square inch of area between the plates will be substantially uniform throughout the pressure area. By reason of the normal curvature of the plates, (which curvature will be resumed when the clamping action of the bolts is released) it will be seen that at no time will the folded edges of the tube be subjected to a pinching pressure tending to break or crack the same; it being obvious that a tear extending across the tube would be impracticable to be repaired by this or any analogous quick repair device. The progressive increase of the pressure areas of the plates applied to the patch has the effect of spreading the cement uniformly between the patch and adjacent surface of the tube.

The device may be economically constructed, by reason of the fact that the plates 10 and 11 are practically identical. Furthermore, the device is light to handle and is exceedingly durable. The device may be made of spring steel, or any suitable soft steel which is hammered to give the required resiliency thereto.

It will be obvious that the structural details of the device may be somewhat varied within the spirit and scope of the invention, and said invention is not limited to such details except as hereinafter made the subject of specific claims.

I claim as my invention:—

A device for repairing pneumatic tire tubes and the like comprising two curved spring members arranged with their convex faces together at the median line of the members and pressure means applied to the margins of the members to press the members upon an interposed tube.

In testimony, that I claim the foregoing as my invention I affix my signature in the presence of two witnesses, this 1st day of October, A. D. 1910.

ADOLPH R. HOEFT.

Witnesses:
W. L. HALL,
WILLIAM GOLDBERGER.